June 20, 1939.  A. T. MACE  2,163,465

ANTENNA

Filed Dec. 31, 1937

INVENTOR.
Arthur T. Mace
BY
Ray, Oberlin & Ray
ATTORNEYS.

Patented June 20, 1939

2,163,465

UNITED STATES PATENT OFFICE 2,163,465

ANTENNA

Arthur T. Mace, East Cleveland, Ohio, assignor to The Radiart Corporation, Cleveland, Ohio, a corporation of Ohio Application December 31, 1937, Serial No. 182,756

3 Claims. (Cl. 250—33)

This invention relates to a bracket member with an adjustable mounting to hold the same in various positions. It is more particularly directed to an adjustable bracket for use in supporting aerials mounted on motor vehicles.

Aerials are supplied in conjunction with radio sets in motor vehicles and are usually mounted on the exterior of the car extending from a point adjacent the hood of the car upwardly beyond the top. In order to present a neat appearance the angle at which the aerial is supported should conform to the windshield angle of the car. This angle varies with different makes of cars. For purposes of economy it is essential that one aerial be adjustable for different types of cars, and to this end must be so made as to be freely adjustable to conform to the windshield angle.

The general object of my invention therefore has been to provide an adjustable aerial support which may be readily used with different makes of vehicle and conform to the windshield angle of each. An additional object has been to provide a bracket supported by one of the door hinge pins in such manner that the bracket is prevented from any play which might cause the aerial to swing out of its adjusted position.

Other objects of my invention will become apparent from the following specification and from the drawing appended hereto, while the novel features are summarized in the claims.

In said annexed drawing:—

The aerial bracket comprising my invention consists of two parts, one rigid with the body and the other adjustably carried thereby and in turn supporting the aerial. The fixed portion of the bracket comprises a metal plate 10, shown in Fig. 4, provided with a curved face 12, best shown in Fig. 3, and which face is provided with a slot 14.

Figure 4:
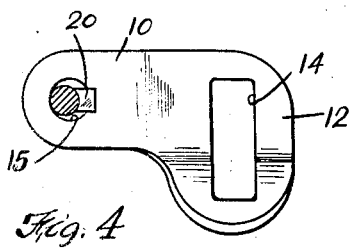
Fig. 4 is a plan view of that portion of the bracket rigid with the body showing the method of mounting the same thereon.

To support the plate on the vehicle, a key-hole 15 is provided, as shown in Fig. 4, and adapted to encircle the hinge pin of one of the car hinges 18 supporting the front door. The hinge pin is prevented from turning in the body portion of the hinge by lengthwise serrations adjacent the head which cut into the hinge body and prevent relative rotation between the two. Ordinary vehicle hinge pins are made in three sizes and the circular portion of the key hole 15 is of such diameter as to accommodate the largest by a drive fit. Smaller hinge pins pass through the hole 15 with considerable clearance, and to provide a tight grip between the pin and the plate a wedge member 20, of thickness equal to the thickness of the plate 10 and serrated at opposite ends, is employed. The wedge is of such length as to be driven between the base of the key-hole slot 10 and the adjacent hinge pin, thus wedging the serrations in the pin tightly into the wedge. This effectively secures the plate to the hinge without the possibility of turning between the two and since the pin is similarly wedged into the hinge there is no relative rotation between the plate and the vehicle door.

Figure 1:
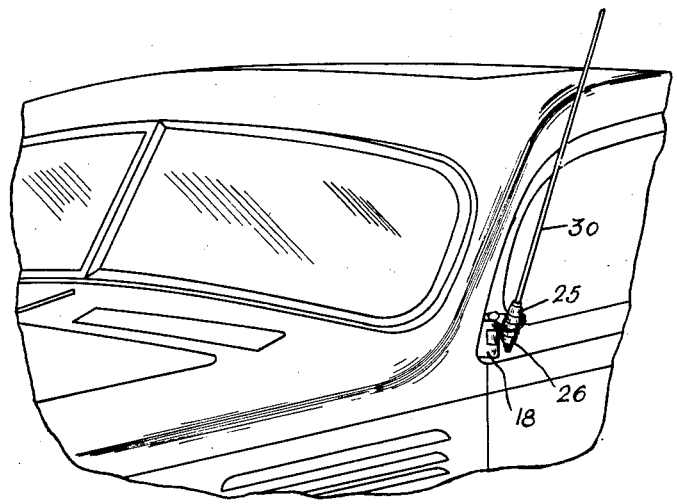
Fig. 1 is a partial illustration of a vehicle body showing my improved aerial bracket mounted in place thereon.
Figure 2:
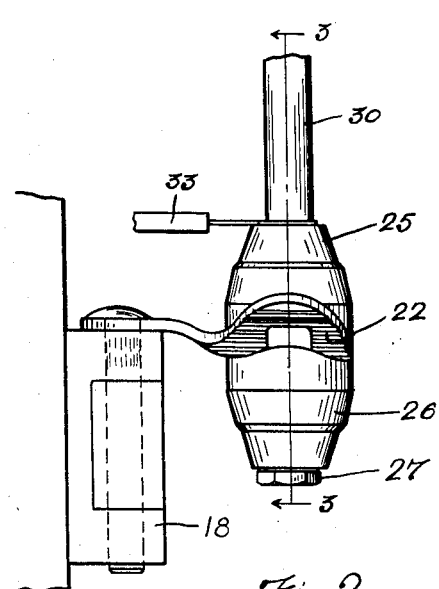
Fig. 2 is an elevation of the bracket looking at the same from the front of the vehicle.

The curved face 12 of the plate 10 provides an adjustable mounting for the aerial. To this end the under side of the curved portion is provided with serrations 22, as shown in Fig. 2. A pair of molded plastic insulator blocks 25 and 26 are mounted on opposite sides of the curved portion 12. Serrations are cut in the lower block to mesh with the serrations 22 above described and prevent relative movement between the block and plate when the two have been secured in an adjusted position. A bolt 27 passes through the insulator blocks and threadingly engages the ferrule portion 30 of the aerial. As the bolt 27 is threaded into the ferrule, it not only locks the latter member against the top insulator block, but locks the two blocks tightly in engagement with the curved face 12 to adjustably position the aerial and maintain the position, due to the interlocking serrations. Split washers are provided between the bolt head and ferrule and each of the insulator blocks respectively.

The aerial and its component parts are insulated from the automobile body. Thus, the insulator blocks each carry shoulders of a width equal to the slot width 14 and of a length substantially less, and indicated at 31. The shank of the bolt 27 is of less diameter than the width of the slot 14 and is prevented from contact therewith by the aforementioned shoulders. A lead-in 33 for the aerial is clamped between the ferrule 30 and the top insulator block 25.

Figure 3:
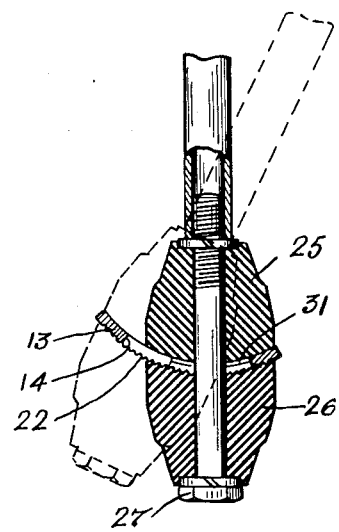
Fig. 3 is a section through Fig. 2, as indicated by the lines 3—3 thereon.

It follows from the above description that the bracket just described may be adjustably positioned to occupy either the solid position shown in Fig. 3 or the dotted line position, or any desired position between the two.

From the foregoing description it will be apparent that I have provided a novel aerial supporting bracket of a universal nature which may be used on many different styles of vehicles. The bracket of course is subject to other uses than for automobile aerials.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In an aerial unit for mounting on a vehicle body in conformity with the body angle of a portion of said body, a supporting bracket with a curved face adapted to be mounted with the vertical plane of said curved face parallel to the longitudinal axis of said vehicle, a slot in said face parallel to the plane of curvature through the curved face, an aerial member and a lead-in therefor, an insulating member adapted to engage said aerial and said bracket and electrically separate them one from the other and a member adapted to secure said aerial in an adjusted position with respect to said bracket and to pass through said bracket slot.

2. In an aerial unit for mounting on the side of a vehicle body in conformity with the body angle of a portion of said body, a supporting member with a curved face adapted to be mounted with the vertical plane of said curved face parallel to the longitudinal axis of said vehicle, a slot in said face parallel to the plane of curvature through the curved face, a pair of centrally pierced curved members formed of moisture-proof-insulating material, said members respectively provided with a convexly curved surface and a concavely curved surface to conform to the shape of said curved face, a threaded bolt member of less thickness than the width of said slot passing through said piercings and through the slot in said face, and electrically insulated from said supporting member, a tubular aerial member threadingly engaging said bolt to clamp said curved members in adjusted position on said curved face and a lead-in connected to said aerial and together with said aerial and said bolt electrically insulated from said supporting member.

3. In an aerial unit for mounting on the side of a vehicle body in conformity with the body angle of a portion of said body, a supporting member with a serrated and curved face adapted to be mounted with the vertical plane of said curved face parallel to the longitudinal axis of said vehicle, transverse serrations on one side of said face, a slot in said face parallel to the plane of curvature through the curved face, a pair of centrally pierced curved members formed of moisture-proof insulating material, said members respectively provided with a convexly and concavely curved surface to conform to the shape of said curved face when said members are mounted respectively on opposite sides thereof, serrations on one of said members to engage the serrations on said curved face, spacing shoulders on said members to engage in said slot and position the members with respect thereto, a threaded bolt member of less thickness than the width of said slot passing through said piercings and through the slot in said face, and electrically insulated from said serrated supporting member, a tubular aerial member threadingly engaging said bolt to clamp said curved members in adjusted position on said curved face and a lead-in connected to said aerial and together with said aerial and said bolt electrically insulated from said serrated supporting member.

ARTHUR T. MACE.